United States Patent
Weiss et al.

(10) Patent No.: US 12,430,417 B1
(45) Date of Patent: Sep. 30, 2025

(54) AUTHENTICATION OF IMAGES BASED ON PROJECTED ENCODED PATTERN

(71) Applicant: International Business Machines Corporation, Armonk, NY (US)

(72) Inventors: Jonas Weiss, Oberrieden (CH); Robert Dean Lovchik, Schoenenberg (CH); Alessandro Sorniotti, Zurich (CH); Julia Hesse, Langnau am Albis (CH)

(73) Assignee: International Business Machines Corporation, Armonk, NY (US)

( * ) Notice: Subject to any disclaimer, the term of this patent is extended or adjusted under 35 U.S.C. 154(b) by 71 days.

(21) Appl. No.: 18/619,476

(22) Filed: Mar. 28, 2024

(51) Int. Cl.
  *G06F 21/00* (2013.01)
  *G06F 21/32* (2013.01)
  *G06F 21/36* (2013.01)
  *H04L 9/32* (2006.01)
  *G06Q 20/40* (2012.01)

(52) U.S. Cl.
  CPC ............. *G06F 21/36* (2013.01); *G06F 21/32* (2013.01); *H04L 9/3297* (2013.01); *G06Q 20/40145* (2013.01)

(58) Field of Classification Search
  None
  See application file for complete search history.

(56) References Cited

U.S. PATENT DOCUMENTS

| | | | |
|---|---|---|---|
| 7,508,960 B1 | 3/2009 | Bolle et al. | |
| 11,423,638 B2 | 8/2022 | Ye et al. | |
| 11,693,938 B2 | 7/2023 | Tussy | |
| 11,762,969 B1 * | 9/2023 | Khan | G06V 10/70 713/186 |

(Continued)

FOREIGN PATENT DOCUMENTS

CN  105389491 B  9/2020

OTHER PUBLICATIONS

Li, Zhifeng et al. Aging Face Recognition: A Hierarchical Learning Model Based on Local Patterns Selection. IEEE Transactions on Image Processing, vol. 25, Issue: 5. https://ieeexplore.ieee.org/stamp/stamp.jsp?tp=&arnumber=7420684 (Year: 2016).*

(Continued)

*Primary Examiner* — Jeremiah L Avery
(74) *Attorney, Agent, or Firm* — CANTOR COLBURN LLP; Anthony Mauricio Pallone

(57) ABSTRACT

Mechanisms for verifying a captured digital image are provided. A verifier computing system generates, in response to a request to perform digital identity verification of a subject, a computer readable first encoded pattern. Light projecting equipment of the verifier computing system, projects the first encoded pattern onto a physical surface associated with the subject. Digital image capturing equipment of a prover computing system captures a digital image of the subject while the first encoded pattern is projected onto the physical surface such that the captured digital image captures both an image of the subject and the projected first encoded pattern. The prover computing system generates a second pattern based on an extraction key received from the verifier computing system. The prover computing system verifies an authenticity of the captured digital image based on a matching of the second pattern to the first pattern.

20 Claims, 4 Drawing Sheets

(56) References Cited

U.S. PATENT DOCUMENTS

| | | | |
|---|---|---|---|
| 12,099,357 B1* | 9/2024 | Ebrahimi Afrouzi | ........................ G05D 1/0214 |
| 2019/0042718 A1 | 2/2019 | Prakash et al. | |
| 2021/0192669 A1* | 6/2021 | Osborn | ................... G06F 21/32 |
| 2021/0209606 A1* | 7/2021 | Herlands | ............ G06Q 20/4016 |
| 2022/0147970 A1* | 5/2022 | Babcock | ............ G06Q 20/4016 |
| 2023/0031087 A1* | 2/2023 | Tussy | ...................... G06F 21/53 |
| 2023/0103695 A1 | 4/2023 | Streit | |
| 2023/0230085 A1* | 7/2023 | Turgeman | ............... G06Q 20/10 |
| 2023/0368206 A1* | 11/2023 | Turgeman | ............... G06F 21/32 |
| 2023/0376581 A1* | 11/2023 | Shear | ...................... G06V 40/45 |
| 2024/0070251 A1* | 2/2024 | Maizels | ................. G10L 13/02 |
| 2024/0073219 A1* | 2/2024 | Maizels | ................. G10L 17/02 |
| 2024/0167236 A1* | 5/2024 | Cristache | .............. H04W 12/08 |

OTHER PUBLICATIONS

Bi, Mingyue et al. Multi-view Facial Expression Recognition Based on Fusing Low-level and Mid-level Features. 2018 37th Chinese Control Conference (CCC). https://ieeexplore.ieee.org/stamp/stamp.jsp?tp=&arnumber=8483908 (Year: 2018).*

Yao, Anbang; Yu, Shan. Robust Face Representation Using Hybrid Spatial Feature Interdependence Matrix. IEEE Transactions on Image Processing, vol. 22, Issue: 8. https://ieeexplore.ieee.org/stamp/stamp.jsp?tp=&arnumber=6459600 (Year: 2013).*

Gunasinghe, Hasini et al., "PrivBioMTAuth: Privacy Preserving Biometrics-Based and User Centric Protocol for User Authentication From Mobile Phones", IEEE Transactions on Information Forensics and Security, vol. 13, No. 4, Apr. 2018, 16 pages.

Im, Jong-Hyuk et al., "Practical Privacy-Preserving Face Authentication for Smartphones Secure Against Malicious Clients", IEEE Transactions on Information Forensics and Security, vol. 15, Jan. 28, 2020, 16 pages.

Praveen, R et al., "A secure lightweight fuzzy embedder based user authentication scheme for internet of medical things applications", Journal of Intelligent & Fuzzy Systems, vol. 44, No. 5, May 4, 2023, 20 pages.

Quiring, Erwin et al., "Fraternal Twins: Unifying Attacks on Machine Learning and Digital Watermarking,", arXiv:1703.05561v1 [cs.CR], Mar. 16, 2017, 17 pages.

* cited by examiner

AUTHENTICATION OF IMAGES BASED ON PROJECTED ENCODED PATTERN

BACKGROUND

The present application relates generally to an improved data processing apparatus and method and more specifically to an improved computing tool and improved computing tool operations/functionality for performing authentication of images based on a projected encoded pattern.

Digital identity verification is increasingly being relied upon by service and product providers as a mechanism for authenticating users before providing the services/products. Through the various instances of digital identity verification, users are able to authenticate themselves to service/product providers and/or third party verifiers (collectively referred to herein as "verifiers") in a digital manner.

Authentication in these settings typically proceeds as follows. An issuer (e.g. a state, a province, a corporation) publishes verification information in a public registry, e.g., issuers issue cryptographic credentials (e.g., signatures) to holders, attesting some attributes of these holders (e.g., name, age, vaccination status, etc.). Holders of these credentials store the credentials in digital wallets, e.g., a digital wallet on a mobile phone or the like. The holders authenticate themselves to verifiers by showing the credentials, or by engaging in protocols to prove knowledge of such credentials, from their digital wallets, where these credentials are the credentials issued by issuers the verifier trusts. If verification succeeds, i.e., the credentials presented by the holder are authenticated as matching the issued credentials for that holder, the holder can get some service/product from the verifier.

Verification may also involve an extra step of producing some kind of physical documentation, e.g., a paper ID such as a passport, driver's license, membership credential document, or the like, to allow the verifier to match the individual presenting the physical documentation. For example, the picture of the individual on the physical document, e.g., paper ID, may be matched to an existing stored image of the individual, and the personal details of the individual on the paper ID and the personal details of the individual on the digital credential may also be matched. In this way the verifier is convinced that the holder has not just stolen the mobile wallet of a victim holder and is authenticating on their behalf or adopting their identity nefariously.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for verifying a captured digital image. The method comprises generating, by a verifier computing system, in response to a request to perform digital identity verification of a subject, a computer readable first encoded pattern. The method further comprises projecting, by light projecting equipment of the verifier computing system, the first encoded pattern onto a physical surface associated with the subject. In addition, the method comprises capturing, by digital image capturing equipment of a prover computing system, a digital image of the subject while the first encoded pattern is projected onto the physical surface such that the captured digital image captures both an image of the subject and the projected first encoded pattern. Moreover, the method comprises generating, by the prover computing system, a second pattern based on an extraction key received from the verifier computing system. In addition, the method comprises verifying, by the prover computing system, an authenticity of the captured digital image based on a matching of the second pattern to the first pattern.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
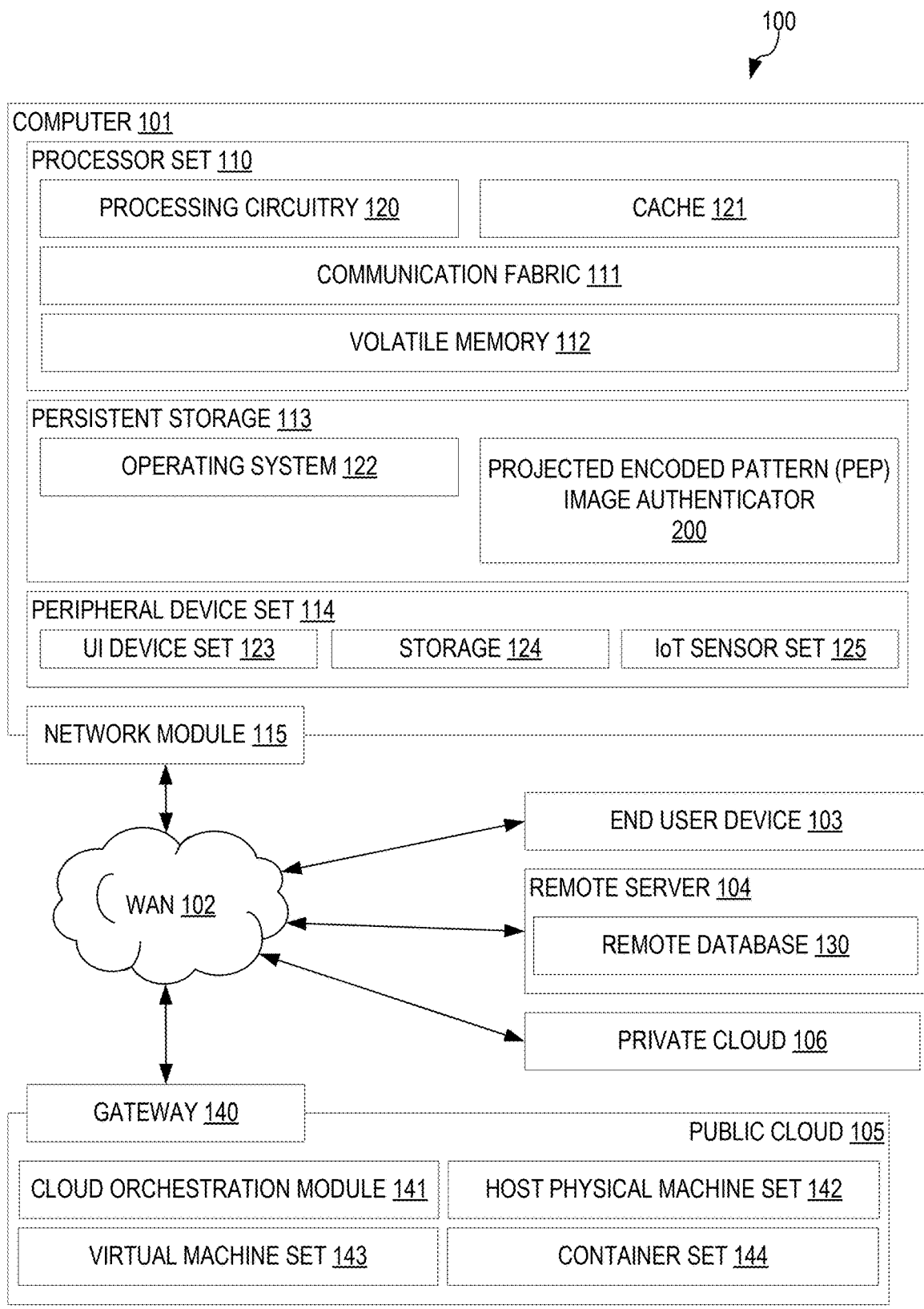
FIG. 1 is an example diagram of a distributed data processing system environment in which aspects of the illustrative embodiments may be implemented and at least some of the computer code involved in performing the inventive methods may be executed.

The illustrative embodiments provide an improved computing tool and improved computing tool operations/functionality for performing authentication of images based on a projected encoded pattern. These mechanisms may be used as part of a digital identity verification mechanism and ensures that the images being presented for verification of a user's identity are current images and not images that may have been previously captured or images that were obtained surreptitiously from other sources, such that the presenter of the image may not be the authorized user.

In some illustrative embodiments, the projected encoded pattern may be projected onto a subject when capturing an image of the subject. The projected encoded pattern may encode, in a computer readable manner, any suitable information that may be used to indicate the authenticity of the temporaneous nature and/or location of the captured image. The encoded pattern is projected onto the subject when the digital image is captured such that the projected pattern is embedded in the data of the captured image and cannot be modified without compromising the integrity of the captured image. The encoded pattern may then be used to verify that the captured image is a current or recent image based on the encoded information in the pattern. This verification may be used along with biometric verification, e.g., facial recognition, fingerprint recognition, etc., so as to verify the identity of the user.

When the digital image is captured, where the image comprises data representing not only the subject of the image but also the projected encoded pattern, a digital signature or other integrity enforcement mechanism may be generated and used to verify that the data structure representing the digital image of the subject/projected encoded pattern is not modified prior to verification. These mechanisms operate to address problems associated with digital identity verification technology in that there are no current mechanisms to ensure that the images presented for verification are current images presented by the actual authorized user, e.g., the authorized holder of digital wallet credentials.

That is, one of the largest issues with digital identity verification technology is privacy. The generation and exchange of digital statements creates a digital trail of information about an individual that, if misused, may be abused for illegal mass data collection, surveillance, profiling, impersonation or identity theft. This leads to the use of biometrics, facial image recognition, or other image based mechanisms to verify the identity of the user presenting credentials as proof of their identity to a verifier. However, such image based mechanisms can still be thwarted by sophisticated fraudsters that access previously captured and/or stored images of users and present them to verifiers for verification.

Some digital identity verification mechanisms require that the individual, who is the subject of a verification by a verifier, be the one to capture the image for verification purposes. This may be due to privacy and data protection laws, such as the General Data Protection Regulation (GDPR) or the like. Thus the verification needs to take place on a computing device owned and controlled by the "prover", i.e. the user that asks for verification also needs to take the picture using their own device. This comes with the risk that a picture on file can be fed into the verification algorithm of the verifier without the verifier being aware of it. For example, if an unauthorized individual gains access to a user's computing device, when needing to perform verification to gain access to secured data, products, or services, the unauthorized individual may install software on the device that can bypass the image capturing equipment of the device and can instead feed a prior image, such as from a stored filed, to thereby pretend to be the authorized user and that this prior image is a currently captured image. As a result, an unauthorized individual, e.g., a fraudster, may gain access to protected resources through fraudulent means.

Multi-Party Computation (MPC) protocols (or similar protocols for verifiable computation) are cryptographic solutions that ensure the correct execution of a particular function in untrusted setups, while preserving the privacy of the inputs. As such, they are ideally suited to match an input digital image and a biometric template such that the verifier is convinced that the match is genuine. In such solutions, the inputs do not need to be disclosed and can be kept private by the prover. However the verifier is still unable to check whether the submitted digital image was the one that the prover just captured, or is another digital image that the prover may have obtained from a different source or which was previously captured and stored.

The MPC/verifiable computation circuit should perform three verifications: (1) verify that the submitted digital image and a previously stored template match; (2) verify that the template matches a template in some credential issued by an issuer that is trusted by the verifier; and (3) the digital image submitted for verification is one that is current, i.e., "has just been taken" by the prover. The verifications (1) and (2) may be performed by mechanisms performing, for example, facial recognition to match a digital image of a prover's facial features to a previously stored template for an authorized user's facial features, and ensuring that the stored template is from a source that the verifier knows to be authentic.

However, with regard to verification (3) there are no existing mechanisms to adequately ensure the temporal aspects of the submitted digital image in a manner that cannot be altered by fraudsters. That is, in the digital age, it is rather trivial for individuals to obtain and/or alter digital images and use them to thwart verification mechanisms and potentially adopt the identity of others for fraud purposes. It is difficult for verifiers to verify the authenticity of the images submitted for verification. As such, it would be relatively easy for a malicious holder to bypass verification (3) by colluding with someone who owns a credential (with a biometric template matching their facial features), receiving the credential of the colluding user and authenticating with the credential. When asked to supply an image of themselves and the biometric template (e.g., facial image for facial recognition, fingerprint for fingerprint verification, etc., hereafter facial image recognition will be used as an example), the malicious holder may supply an image of the colluding user and the biometric template of the colluding user's credential rather than a current contemporaneously captured image. Moreover, in some cases, the digital image may be edited, e.g., by superimposing today's newspaper, or the block hash of the latest bitcoin block, to convince the verifier that the image was freshly taken. In this way, the malicious holder bypasses verification since the verifier cannot tell whether the picture is "fresh", i.e., current, or not.

Thus, there is a need for an improved computing tool and improved computing tool operations/functionality to ensure the veracity of the digital image being presented to a verifier for verification of the identity of the individual requesting verification. The illustrative embodiments provide such an improved computing tool and improved computing tool operations/functionality which operate to prevent above scenarios and provide mechanisms to implement verification (3) above in a manner that prevents malicious parties from submitting previously captured and/or edited digital images and be verified.

The following description provides examples of embodiments of the present disclosure, and variations and substitutions may be made in other embodiments. Several examples will now be provided to further clarify various aspects of the present disclosure.

Example 1: A method, in a data processing system, for verifying a captured digital image. The method comprises generating, by a verifier computing system, in response to a request to perform digital identity verification of a subject, a computer readable first encoded pattern. The method also comprises projecting, by light projecting equipment of the verifier computing system, the first encoded pattern onto a physical surface associated with the subject. The method further comprises capturing, by digital image capturing equipment of a prover computing system, a digital image of the subject while the first encoded pattern is projected onto the physical surface such that the captured digital image captures both an image of the subject and the projected first encoded pattern. In addition, the method comprises generating, by the prover computing system, a second pattern based on an extraction key received from the verifier computing system. The method further comprises verifying, by the prover computing system, an authenticity of the captured digital image based on a matching of the second pattern to the first pattern.

The above limitations advantageously enable verification of the temporal nature of the captured image by ensuring that the first encoded pattern that is captured in the captured image because of the projection of the first encoded pattern matches the second encoded pattern generated from the extraction key. This avoids the problems associated with unauthorized individuals spoofing the identity of a subject by using older images of the subject in an unauthorized manner. Thus, when performing identity verification operations, the evidence provided, i.e., the captured digital image, can be verified to be a "fresh" or contemporaneous captured digital image and thus, the evidence of identity can be relied upon for identity verification operations.

Example 2: The limitations of any of Examples 1 and 3-10, where the computer readable encoded pattern is generated based on a function of a timestamp associated with the request. The above limitations advantageously enable the encoding of temporal information into the projected first encoded pattern such that temporal information for the captured digital image is essentially embedded into the captured digital image in a manner that cannot be modified by unauthorized individuals.

Example 3: The limitations of any of Examples 1-2 and 4-10, where the computer readable encoded pattern is a noise pattern, and wherein the noise pattern is present in the captured digital image below a noise level of the captured digital image and is not distinguishable from background noise in the captured digital image. The above limitations advantageously enable the mechanisms of the illustrative embodiments to operate without interfering with identity verification mechanisms, such as facial recognition, fingerprint recognition, or other biometric verification mechanisms because the noise pattern does not obfuscate the features used for such verification. Moreover, the noise pattern is not readily recognized by the human eye and hence, its presence is not able to be easily discerned.

Example 4: The limitations of any of Examples 1-3 and 5-10, where the computer readable encoded pattern comprises at least one of a quick response code or a bar code. The above limitations advantageously provide a mechanism by which the temporal aspects of the captured digital image can be embedded in the captured digital image in a manner that is not readily readable by human beings, yet can be recognized by computing tools that have access to the data used to encode the first encoded pattern. Thus, the captured digital image can only be verified using computing tools and specifically computing tools that have access to the specific data used to encode the patterns, where this data may include temporal information associated with when the first encoded pattern is generated and projected such that it may be captured in the captured digital image.

Example 5: The limitations of any of Examples 1-4 and 6-10, where the extraction key is a cryptographic key used to generate the first encoded pattern and is generated based on a function of a timestamp associated with the request, and wherein verifying the authenticity of the captured digital image verifies that the captured digital image is a recently captured digital image within a given time period of the timestamp associated with the request. The above limitations advantageously ensure that the captured digital image is a recent captured digital image such that unauthorized individuals cannot spoof the identity of a subject by using modified older images of the subject.

Example 6: The limitations of any of Examples 1-5 and 7-10, where the extraction key is further generated based on a function of a location stamp associated with a physical location of the verifier computing system and wherein the first encoded pattern is further generated based on the location stamp. The above limitations advantageously increase the security of the verification of the authenticity of the captured digital image by enabling verification of not only the temporal aspects of when the digital image is captured, but also the spatial aspects with regard to where the digital image is captured. This makes spoofing the subject's identity even less possible by unauthorized individuals.

Example 7: The limitations of any of Examples 1-6 and 8-10, where the method further comprises executing a digital identity verification operation on biometric information of the subject in response to results of the verifying operation indicating that the captured digital image is authentic, and controlling access to resources or performance of a transaction based on the digital identity verification operation. The above limitations advantageously predicate the digital identity verification on the verification of the authenticity of the captured digital image that is used to perform the digital identity verification. Thus, the claimed invention ensures that the captured digital image is authentic and then uses this authenticated captured digital image to perform digital identity verification. This provides greater assurances that the digital identity verification is legitimate and not able to be thwarted by unauthorized individuals using modified older images of the subject.

Example 8: The limitations of any of Examples 1-7 and 9-10, where the physical surface associated with the subject comprises one of a physical surface of the subject, or a physical surface of a transparent screen provided between the subject and the digital image capturing equipment. The above limitations advantageously allow for various ways to project a first encoded pattern in a manner that it may be captured in combination with the features of the subject such that the captured digital image comprises a compilation in which the projected first encoded pattern is embedded with the features of the subject. This makes the projection of the first encoded pattern more adaptable to conditions at the location where the first encoded pattern is projected and may accommodate potential skewing or warping of the projected first encoded pattern based on the orientation and curvatures of the surface upon which the first encoded pattern is projected.

Example 9: The limitations of any of Examples 1-8 and 10, where the first encoded pattern is not perceivable by the naked human eye but is recognizable by computer vision mechanisms, and wherein the first encoded pattern is not decipherable by human beings but is decipherable by computer cryptographic tools. The above limitations advantageously reduce the likelihood that a human being will be able to determine that a particular captured digital image has a first encoded pattern embedded in it, and even if able to discern the presence of such an embedded encoded pattern, will not be able to decipher it as it is not human readable.

Example 10: The limitations of any of Examples 1-9, where the prover computing system is a portable computing device associated with the subject, and wherein the verifier computing system is associated with one of a provider of protected resources, products, locations, or services, or a third party entity that operates to perform verifications on behalf of the provider of protected resources, products, locations, or services. The above limitations advantageously enforce the maintaining of the captured digital image, and thus, the personal information of the subject, within the subject's own computing device and without divulging this personal information to the verifier computing system, yet still performing verification of the captured digital image. Thus, the security of the subject is maintained.

Example 11: A computer program product comprising one or more computer readable storage media, and program instructions collectively stored on the one or more computer readable storage media, the program instructions comprising instructions configured to cause one or more processors to perform a method according to any one of Examples 1-10. The above limitations advantageously enable a computer program product having program instructions configured to cause one or more processors to perform and realize the advantages described with respect to Examples 1-10.

Example 12: A system comprising a verifier computing system having light projection equipment and a prover computing system having digital image capture equipment that are specifically configured to perform the operations of a method according to any one of Examples 1-10. The above limitations advantageously enable a system comprising the verifier computing system and prover computing system to perform and realize the advantages described with respect to Examples 1-10.

Thus, with the mechanisms of the illustrative embodiments, an encoded pattern is projected onto the subject at substantially the same time as the digital image is captured. In some illustrative embodiments, the encoded pattern may encode the timestamp and/or location data for the subject at the time and location of the digital image capture, i.e., the encoded pattern may be generated based on the timestamp and/or location stamp for the point in time and space when/where the digital image used for verification is captured. While the embodiments are described with regard to the encoded pattern being generated based on the timestamp/location stamp, this is not required and other embodiments can have the encoded pattern generated based on any cryptographic process to generate a secret pattern that is projected by the verifier computing system, and at substantially a same time is delivered to a prover computing system in a secure manner. Thus, the projected encoded pattern can be any secret pattern generated in a manner that it conveys the contemporaneous aspect of the projection of this secret pattern onto a subject, with the capturing of the digital image.

The encoding may be performed using cryptographic mechanisms and may result in an encoded pattern that is not decipherable by human beings, and in some cases may not be easily discerned using the naked human eye, but is recognizable by computing tools and computer vision mechanisms, e.g., a Quick Response (QR) encoding, bar code encoding, or any other suitable encoding. In some illustrative embodiments, the encoding itself may use cryptographic keys and encryption mechanisms to encrypt the data in the pattern such that even if the pattern is perceivable by a party receiving the captured digital image, it cannot readily be decrypted without knowing the appropriate cryptographic keys for proper decryption. The encoded patterns are functions of the timestamp and/or location stamp associated with the verification operation and thus, will be different for different times and locations of verification operations. Moreover, as noted hereafter, a plurality of different functions may be used for generating a plurality of encoded patterns, or portions of an overall encoded pattern, e.g., in the case of patches of sub-patterns tiled across a subject.

The encoded pattern is projected onto the subject, e.g., a face of an individual, via a projection mechanism built into a verifier's computing device. The verifier is a party that wishes to verify the digital identity of the party requesting access to protected resources, products, locations, services, etc. The verifier may be the provider of these protected resources, products, locations, services, etc., for example, or may be a separate third party entity that operates to perform verifications on behalf of such providers. Conceptually, one might think of the provider as an owner/operator of a location, the verifier as the doorman or "bouncer" manning the entrance to the location, and the user, also referred to as a "prover", as a person requesting admittance to the location via the entrance. The verifier may project the encoded pattern onto the user and the combination of the projected encoded pattern and the user's facial features may be captured by image capturing equipment on the user's device for verification of not only the user's identity via biometric verification, e.g., facial recognition or the like, but the temporal nature of the captured image, so as to ensure that the verification is being performed with regard to a currently captured image. Once the user's identity is confirmed and the temporal nature of the captured image is confirmed, the user may be presented with the necessary credentials to access the protected resources, products, locations, services, etc.

For example, in some illustrative embodiments, the encoded pattern may be an image that is superimposed on the surface of the subject by an image projection mechanism of the verifier's computing device (e.g., the doorman or "bouncer" in the above example scenario). With the encoded pattern being generated at the time of capturing the digital image and superimposed substantially at the same time as the digital image is captured, improved security is achieved by avoiding potential surreptitious modification of the captured digital image after the capturing. That is, with some illustrative embodiments, the encoded pattern is based on the temporal and/or location based information for the point in time and space when/where the digital image is captured, and is projected onto the physical subject when the digital image of the physical subject is captured. Thus, the identity of the authorized user is less likely to be able to be spoofed by malicious parties surreptitiously by modifying the digital image after capturing, and being able to gain unauthorized access to the protected resources, products, locations, services, etc. (collectively referred to herein as protected "resources"). Moreover, with additional integrity mechanisms being employed to ensure the integrity of the captured digital image, e.g., hashes or other integrity mechanisms, the possibilities of modification of the captured digital image without detection are further reduced, i.e., a malicious party cannot access the captured digital image, modify it, and the modification be not detected since integrity mechanisms will show that the captured digital image was modified.

In every digital image, noise is present in the digital image, where noise is anything that is not pertinent to the particular operation being performed. In some illustrative embodiments, the encoded pattern is projected on the physical subject in a manner that is below the noise level of the captured digital image such that the encoded pattern is not readily discernable to the human eye in a manner distinguishable from the background noise in the captured digital image. In other illustrative embodiments, the encoded pattern may be projected onto the physical subject in a less "fine" pattern. A coarser pattern allows for more reliable and faster pattern extraction when performing the verification of the digital identity, but provides less security than the more fine-grained pattern implementations. Thus, the particular level of granularity of the projection of the encoded pattern may be selected based on the desired implementation and priorities of performance versus security.

With regard to facial recognition or biometric verification, for example, this encoded pattern is projected, e.g., as a light pattern in the visible or non-visible range for the human eye, on the face or surface of the biometric information source, e.g., face, fingerprints or the like, of the subject. The projection of this light pattern is such that while it may affect some aspects of the subject slightly, it does not appreciably alter the extracted facial or biometric features used for verification of the features and are essentially background noise. Thus, facial feature matching and biometric template matching is still made possible, with additional verification of the veracity of the digital image, i.e., verifying the digital image was captured within a recent time period of the verification operation, based on the encoded pattern.

It should be appreciated that in some illustrative embodiments other mechanisms may be utilized to superimpose the encoded pattern onto the physical subject when capturing an image, without departing from the spirit and scope of the present invention. For example, a transparent screen may be provided in a physical location of the physical subject and may be positioned between the image capturing equipment and the physical subject. The encoded pattern may be projected onto, displayed on, or otherwise rendered via the transparent screen such that the encoded pattern provided via the transparent screen and the features of the physical subject are able to be captured by the image capturing equipment. In this way, the captured digital image will capture the encoded pattern superimposed on the physical features of the physical subject, e.g., the facial features of the user ("prover").

The encoded pattern that is projected onto the surface of the subject can be verified by the user's ("prover's") computing system by extracting and matching the encoded pattern identified in the captured digital image with a correct pattern generated based on an extraction key received from the verifier via a trusted communication connection between the verifier computing system and the prover's computing system (or simply "prover"). That is, the verifier computing system projects the encoded pattern, which is encoded with an appropriate extraction key that is based on the timestamp and/or location stamp. In some illustrative embodiments, the extraction key may be the timestamp and/or the location stamp itself (it should be appreciated that herein the phrase "timestamp and/or location stamp" means one of the timestamp or the location stamp, or both). In other illustrative embodiments, the extraction key may be a key generated based on a cryptographic function of the timestamp and/or location stamp. The extraction key information is provided to the prover computing system through a trusted and secure communication, e.g., an ideal functionality, between the verifier computing system and the prover computing system. Thus, when the prover computing system captures the image of the subject with the encoded pattern projected onto the subject, when performing verification, the prover computing system is able to identify and extract the encoded pattern in the captured image using the extraction key by generating a corresponding encoded pattern based on the timestamp and/or location stamp encoded in the extraction key (after decrypting the extraction key) and matching it to the encoded pattern present in the captured digital image. Moreover, the subject's features are also able to be extracted and used as a basis for comparison to one or more stored biometric templates, e.g., facial feature templates, fingerprint templates, retinal scan templates, or the like.

It should be appreciated that while some illustrative embodiments may implement trained machine learning computer models, artificial intelligence mechanisms, and the like, to extract the projected pattern from the captured digital image, such mechanisms are not required in other illustrative embodiments. To the contrary, other algorithm mechanisms may be implemented that may be used to identify and extract the encoded pattern from digital image data without departing from the spirit and scope of the present invention.

Moreover, additional checks may be performed that ensure that the timestamp and/or location stamp corresponding to the extracted encoded pattern is within a predetermined period of time of the generation of the encoded pattern and projection of the encoded pattern onto the subject for capturing of the image. Optionally the additional checks may also verify that the current location of the prover computing device (such as determined from global positioning system (GPS) mechanisms, cellular triangulation, or any other location service available to the prover computing device) matches the location where the encoded pattern was generated and projected onto the subject. That is, not only do the encoded patterns need to match for verification to be performed successfully, but the timestamps and/or location stamps associated with the encoded pattern have to be within a given time period and/or distance of the time and/or location when the encoded pattern was generated and projected. This is to prevent a user from submitting an older image with an encoded pattern within it that may have been valid at a previous time and at a previous verification location. For example, a user can capture a digital image with the projected encoded pattern and then delay use of the captured digital image to perform verification. While the verification may succeed because the patterns match between the captured image and the pattern generated from the received extraction key, and the facial features match, the timestamp and location stamp may differ from the current time and location by more than a predetermined amount and thus, may still be considered to be "stale" and not useable for verification, i.e., a new captured image is required.

For example, the encoded pattern may be generated based on, and thus encode, the timestamp and/or location stamp corresponding to the location of the digital image capture device associated with the prover computing system and the time the digital image capture device is capturing the digital image, such as by executing a noise generation function using these time and/or location stamps as seed values for generation of the noise pattern. The noise pattern itself may be generated using encoding functions that encode information into a computer readable pattern which is not readily discernable to human beings, e.g., a QR code, bar code, etc. The encoding functions may also use cryptographic functions, e.g., a hash function or the like, to generate the encoded noise pattern as an encrypted pattern and may in fact encrypt the time stamp and/or location stamp in the pattern itself, e.g., an encrypted value that may be projected onto the surface of the subject. The hash function may use a public-secret key or other encryption value to generate the hash value.

Thus, the noise pattern effectively encodes the timestamp and/or location stamp, and the noise pattern itself may be a cryptographic value. The noise pattern that encodes the timestamp and/or location may then be projected onto the surface of the subject so as to superimpose the projected encoded noise pattern onto the features of the subject, e.g., a light pattern on the surface of a person's facial features. By aligning the image capture device, e.g., the camera on the prover's computing device, e.g., smartphone or the like, more or less with the projector axis, the projected encoded noise pattern will experience relatively little distortion on the surface of the subject, e.g., the prover's face. The digital image is then captured with the projected noise pattern and used within the prover's computing system to verify the captured image. It is important to note that the prover's captured image is not transmitted outside of the prover computing system and the verification of the projected encoded pattern, or noise pattern, is performed within the prover's computing system. The verifier computing system provides to the prover computing system the necessary extraction key for extracting and verifying the projected encoded pattern to ensure that it is the correct encoded pattern, i.e., the one that was projected by the verifier computing system when capturing the image. The extraction key encrypts the timestamp and/or location stamp such that it may be decrypted at the prover computing system and used as a basis for generating a pattern for matching to the pattern embedded in the captured image.

It should be appreciated that while in some illustrative embodiments, high-resolution noise patterns are utilized, however this is not a requirement. To the contrary other illustrative embodiments may utilize one or more different resolution noise patterns. For example, in some illustrative embodiments, a sequence of lower resolution images in a video sequence, and thus, lower resolution noise patterns, may be utilized. This may provide an added benefit of making read-out of the noise pattern easier while still maintaining security. Moreover, overall complexity may be combined by moving from a spatial domain into a time domain.

The prover computing system analyzes the composite digital image (having both the biometric features, e.g., facial features, of the individual and the projected encoded pattern or noise pattern) to identify the projected noise pattern in the captured digital image and compare it to a verification pattern generated from the timestamp/location stamp encoded in the extraction key provided by the verifier computing system. That is, the prover computing device decrypts the extraction key to obtain the timestamp/location stamp and generate a similar encoded pattern, e.g., noise pattern, based on the timestamp/location stamp and the encoding function and compares it to the composite digital image to determine if there is a match of the generated pattern with the encoded pattern embedded in the captured digital image.

If there is a match, additional checks may be performed to ensure that the timestamp and location stamp encoded in the extracted encoded pattern are also within a given period of time and distance of the current time/location of the prover computing system. Assuming all checks pass successfully, the captured digital image is verified and the prover is then verified to the verifier computing system, e.g., through a verification communication transmitted from the prover computing system to the verifier computing system, an output display on the prover computing system, or the like. This verification communication may communicate an encrypted value or the like that the verifier computing system can verify is indicative of the prover being verified. Alternatively, the prover computing system may output on a display a code or other displayed text, graphic, or the like, that can be viewed by a user of the verifier computing device, scanned by the verifier computing system, or the like, that verifies the digital identity of the user (prover).

This is to ensure that the prover computing system does not transmit a verification communication without having actually verified the prover, i.e., a fraudster attempting to spoof the verification communication and bypassing the verification mechanisms altogether. In some illustrative embodiments, this verification communication may involve the additional checks being performed at the verifier computing system, e.g., the verification communication may transmit the time/location stamp information obtained from the extracted pattern and this may then be verified as being within the predetermined time window and/or location encoded in the projected encoded pattern or noise pattern. In this way, the prover and verifier can confirm that the provided digital image is the one that was recently captured in a manner that cannot be thwarted easily by adversaries.

It should be appreciated that, by projecting the encoded pattern onto the surface of the subject, e.g., the face of an individual, when the digital image is captured, the projected encoded pattern is embedded into the data of the captured image and cannot be extracted from the captured digital image and used as a basis to modify other images, e.g., "photo-shopped" onto an arbitrary image on file. It should also be appreciated that as the data that is encoded into the projected encoded pattern changes over time, and also possibly over location, even with the same verifier computing device, different encoded patterns are projected depending on the particular time and location at which the prover computing device requests verification and captures the composite digital image.

When the encoded pattern is generated and projected onto the surface of the subject, the resulting captured digital image may be subjected to data integrity verification mechanisms. For example, in order to ensure the integrity of the digital image file, a hash or digital signature of the digital image file may be generated so as to ensure that subsequent modification of the digital image file may be detected. That is, the hash or digital signature of the digital image file may be provided to the verifier such that it may be used to confirm the integrity of the digital image file when it is received by the verifier.

As noted above, the prover computing system performs operations to verify not only the biometric features or facial features of the subject captured in the digital image, but also performs operations to verify, based on the projected encoded pattern, e.g., projected noise pattern, that the digital image itself is one that was recently captured. The prover computing system may perform noise filtering on the captured image to identify the encoded pattern or noise pattern and then use pattern matching techniques to match the extracted pattern to a pattern generated based on the extraction key communicated to the prover computing system from the verifier computing system. This pattern matching can be accomplished in a variety of different ways.

In one illustrative embodiment, the projected encoded pattern, or noise pattern, may be partitioned into a plurality of sub-patterns. For example, if the captured digital image is a 512×512 pixel digital image, the partition-size may be, for example, 32×32 pixels, yielding a 16×16 matrix of encoded pattern or noise pattern patches that are projected onto the surface of the subject or within the image capture field of the image capture device. Moreover, the patches are projected in a corresponding row/column order such that the order of the patches may also be used to verify the patches of the encoded pattern/noise pattern. Each patch may be generated based on a corresponding function of the timestamp/location stamp corresponding to the verification operation, where different functions may be used for different patches such that the patterns in different patches are different from each other. This may be done with regard to each patch, or a subset of patches, where the ordering of the subset of patches may be repeated when projecting the patterns onto the surface of the subject. In some illustrative embodiments, the different patches in the subset of patches may be randomly ordered when projecting the patterns, such that the same order of patches is not repeated.

At the prover computing system, similar functions may be executed based on the extraction key communicated from the verifier computing device. The extraction key may encrypt the timestamp and/or location stamp corresponding to the verification operation, e.g., the timestamp and/or location stamp corresponding to the time/location when the encoded pattern was projected onto the surface of the subject. Every patch is swept across the captured digital image and through pattern matching (e.g., auto-correlation) may be identified as present in the captured digital image. If enough of the patches of the encoded pattern or noise pattern are detected, e.g., a predetermined threshold number of matching patches, e.g., 75%, and detected as being present in a correct order, the digital image may be considered "authentic." The encoded pattern/noise pattern may then be decrypted and the timestamp and/or location stamp may be verified as being the timestamp and/or location corresponding to when the digital image was actually captured and that this timestamp is within a given period of time of the verification operation. If these checks all pass, then the digital image is determined to be verified and usable for performing identity verification by the verifier. It should be appreciated that the verification of the veracity of the digital image itself by the mechanisms of the illustrative embodiments may be performed at substantially a same time as the biometric or facial feature matching for identity verification are being performed by the verifier.

In some illustrative embodiments, in addition to the projection of the encoded pattern onto the subject, other special features may be projected onto the subject which may be visible or detectable by the mechanisms of the illustrative embodiments without the need for the extraction key. Such projected special features may allow for alignment of the digital image for a more efficient decoding process. For example, scale or orientation information may be projected and visible in the captured digital image. Other special features that will aid in the verification of the captured digital image may be projected without departing from the spirit and scope of the present invention. For example, another type of special feature that may be projected and visible in the captured digital image may be an indicator that indicates that hidden information is present in the captured digital image. The indicator may or may not indicate what type of hidden information is present, but can be used by the mechanisms of the illustrative embodiments to determine whether processing of a captured digital image to determine the presence of an embedded encoded patterns and perform the above described operations should be performed.

Thus, the illustrative embodiments provide an improved computing tool and an improved computing tool operation/functionality to synchronously verify that the biometric/facial features of a subject match a previously stored and authentic template of an authorized user's biometric/facial features and, at substantially a same time, guarantee that the captured digital image is current. In this way, the mechanisms of the illustrative embodiments can determine that the digital image that is captured is captured from the individual requesting verification and is captured at the time and location alleged by the individual and is not a previously captured digital image or recording of biometric data that has been somehow modified. Thus, the illustrative embodiments enable all three verifications previously described above.

It should be appreciated that the projection of the encoded pattern with the illustrative embodiments differs from other projection mechanisms that use patterns of dots to measure the features of a subject. That is, other projection mechanisms may project a grid of dots onto a subject and then use the dots to measure distances between the dots and thereby obtain information about the features and contours of the subject itself, e.g., a person's face. However, the projection based mechanisms of the illustrative embodiments project an encoded pattern that is captured when the image is captured and serves as a separate verification of the veracity of the captured image itself. That is, with the mechanisms of the illustrative embodiments, the features of a subject may be verified via a separate set of verifications, e.g., verifications (1) and (2) above, whereas the projected encoded pattern of the illustrative embodiments serves as a separate third verification that verifies the veracity of the captured image itself as being one that was just recently captured for purposes of the verification operation and not a previously captured image that has been retrieved and/or modified for potentially fraudulent use with the present verification.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides mechanisms for controlling the projection of an encoded pattern onto a surface of a subject and capturing a digital image of the combination of the subject and the projected encoded pattern for subsequent verification of the captured digital image. The improved computing tool implements mechanism and functionality, such as a projected encoded pattern (PEP) image authenticator, which cannot be practically performed by human beings either outside of, or with the assistance of, a technical environment. The improved computing tool provides a practical application of the methodology at least in that the improved computing tool is able to verify the veracity of a captured digital image for digital identity verification based on a projected encoded pattern on the subject which is captured in the digital image itself.

FIG. 1 is an example diagram of a distributed data processing system environment in which aspects of the illustrative embodiments may be implemented and at least some of the computer code involved in performing the inventive methods may be executed. That is, computing environment 100 contains an example of an environment for the execution of at least some of the computer code involved in performing the inventive methods, such as projected encoded pattern (PEP) image authenticator 200. In some illustrative embodiments, the PEP image authenticator 200 implements an ideal functionality, meaning that the PEP image authenticator 200 provides a perfectly secure communication channel between the verifier computing system 260 and the prover computing system 205.

In addition to PEP image authenticator 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and PEP image authenticator 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in PEP image authenticator 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in PEP image authenticator 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As shown in FIG. 1, one or more of the computing devices, e.g., computer 101 or remote server 104, may be specifically configured to implement a PEP image authenticator 200. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computer 101 or remote server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates verification of the veracity of a captured digital image by verifying a projected encoded pattern that is projected onto the subject and captured in the digital image, such that the projected encoded pattern may be extracted from the captured digital image and verified, thereby ensuring the digital image was captured within a recent time period of the verification operation and also optionally at a verified location.

Figure 2:
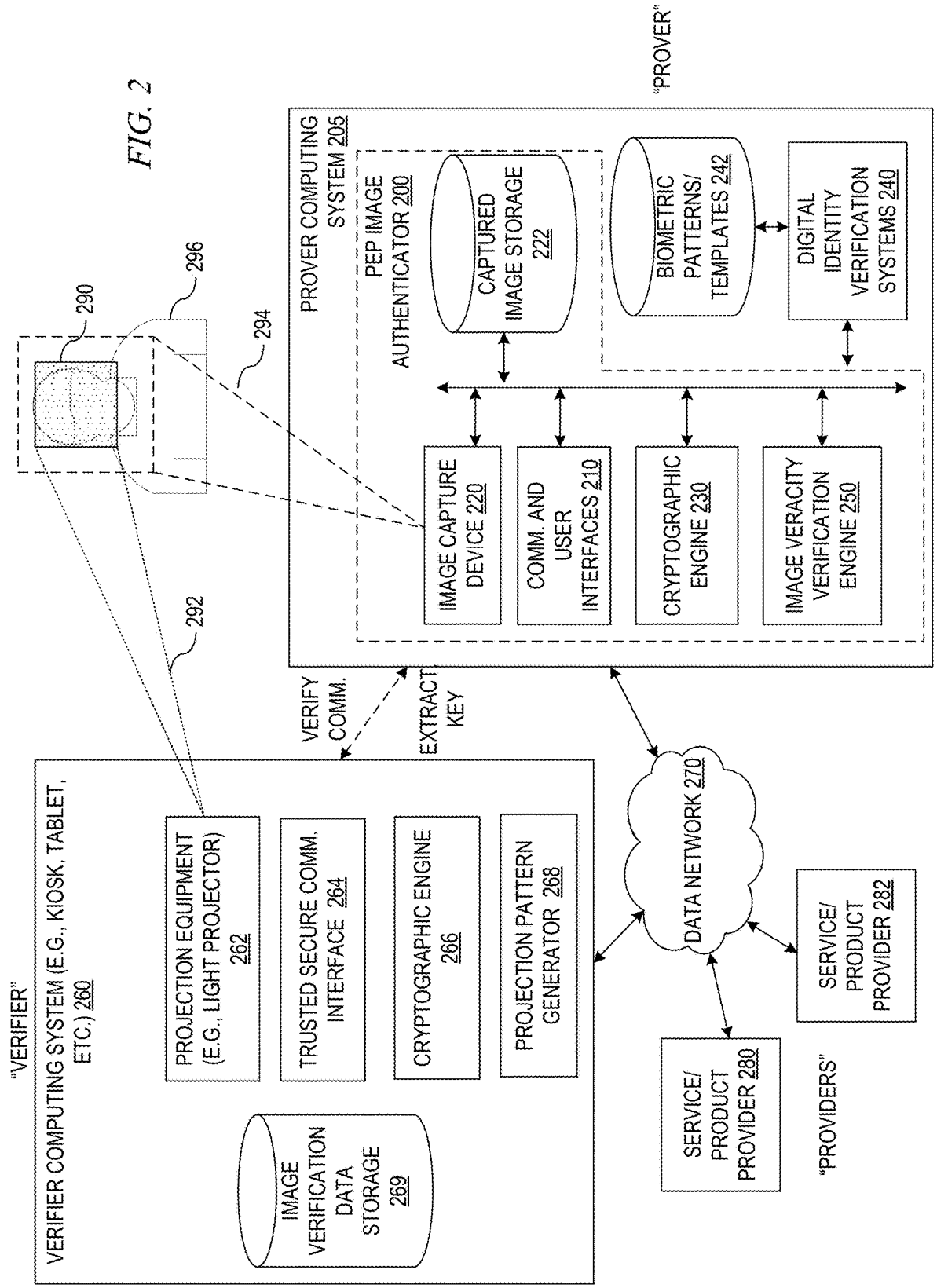
FIG. 2 is an example block diagram illustrating the primary operational components of the projected encoded pattern image authenticator in accordance with one illustrative embodiment.

FIG. 2 is an example block diagram illustrating the primary operational components of the projected encoded pattern image authenticator in accordance with one illustrative embodiment. The operational components shown in FIG. 2 may be implemented as dedicated computer hardware components, computer software executing on computer hardware which is then configured to perform the specific computer operations attributed to that component, or any combination of dedicated computer hardware and computer software configured computer hardware. It should be appreciated that these operational components perform the attributed operations automatically, without human intervention, even though inputs may be provided by human beings, e.g., a user may operate the user's computing device to initiate projection of an encoded pattern and capturing of a digital image, and the resulting output may aid human beings. The invention is specifically directed to the automatically operating computer components directed to improving the way that digital images used for identity verification are themselves verified as being recently captured for purposes of the present verification, and providing a specific solution that encodes a timestamp and optionally location stamp into a computer readable pattern and projects that encoded pattern onto the subject when capturing a digital image of the subject, which is then used as an additional verification of the digital image itself by a verifier computing system. These operations cannot be practically performed by human beings as a mental process and are not directed to organizing any human activity.

As shown in FIG. 2, the projected encrypted pattern (PEP) image authenticator 200 may be provided on a prover computing system 205 which may be a separate computing system from the verifier computing device 260 and service/product provider systems 280-282, but accessible via one or more data networks, e.g., wide area network (WAN) 270. While the PEP image authenticator 200 is shown on a separate prover computing system 205 in FIG. 2, the illustrative embodiments are not limited to such an architecture and configuration of these computing devices and various elements of the PEP image authenticator 200 may be implemented in others of the computing systems, e.g., in the verifier computing system 260 and/or the provider computing devices 280-282. Various modifications to the depicted example architecture and configuration may be made without departing from the spirit and scope of the present invention.

For example, in some illustrative embodiments, the functionality and operations of the image capture device 220 of the PEP image authenticator 200 may be implemented locally by the verifier computing system 260 such that the verifier computing system 260 both projects the encoded pattern and captures the image of the user 296. In such embodiments, the verifier computing system 260 may locally generate the noise pattern and generate cryptographic values based on the noise pattern, as well as project the noise pattern onto the subject and capture the digital image. In such embodiments, the verifier computing system 260, the prover computing system 205, or a combination of the verifier computing system 260 and prover computing system 205, depending on the desired implementation, may perform the other operations described herein to verify the resulting composite digital image having both the image of the subject and the superimposed noise pattern by performing their own pattern matching, timestamp/location stamp verifications, and other cryptographic operations. However, as noted above, it is desirable to have the captured image and verifications performed in the prover's computing system 205 for security purposes and to comply with regulations and thus, that will be the illustrative embodiment described herein.

In some illustrative embodiments, the prover computing system 205, and thus the PEP image authenticator 200, may be integrated into one or more of the provider computing systems 280-282. Thus, the provider computing system 280-282 may not enlist a third party verifier computing system 260 in some illustrative embodiments, which lessens the possibility of malicious interference with a transaction between the provider computing systems 280-282 and the prover computing device 205. In still other illustrative embodiments, only some portions of the prover computing system 205 may be implemented at the provider computing systems 280-282, e.g., some elements of the PEP image authenticator 200 may be implemented at the provider computing systems 280-282 while the digital identity verification systems 240, and biometric patterns/templates 242 used to perform this digital identity verification, may be implemented on the verifier computing system 260, for example. Any suitable configuration for the desired implementation may be used without departing from the spirit and scope of the present invention.

Assuming the depicted architecture and configuration, as shown in FIG. 2, for simplicity the prover computing device 205 is referred to herein as the "prover" 205, the verifier computing system 260 is referred to as the "verifier" 260, and the service/product provider computing systems 280-282 are referred to as the "providers" 280-282. In the depicted example, the prover 205 implements the PEP image authenticator 200 which comprises a communication and user interfaces engine 210, an image capture device 220, a cryptographic engine 230, a captured image data storage 222, digital identity verification systems 240, biometric patterns/templates storage 242, and an image veracity verification engine 250. The communication and user interfaces 210 provides a data communication pathway between the verifier 260 and the one or more data networks 270. Communication with the verifier 260 may be performed directly via wireless communication and/or via the one or more data networks 270. Preferably, communication between the verifier 260 and the prover 205 is performed over secure communication channels established between the verifier 260 and 205 using any known or later developed security protocols and secure communication establishment mechanisms.

Via the secure communication channel established between the verifier 260 and the prover 205, data may be communicated in a secure manner using appropriate encryption mechanisms so as to establish secure communication between the communication and user interfaces 210 and the trusted secure communication interface 264. In this way, the verifier 260 may communicate an extraction key to the prover 205 and the prover 205 can provide verification communications to the verifier 260. Similarly, through other data communication channels, the verifier 260 may communicate results of verification to the providers 280-282 so as to allow verified users, e.g., 296, to access the resources, data, services, and the like, provided by the providers 280-282. These communication channels further allow for the communication of other data that is supportive of the functions and operations described herein, but which will not be separately described in detail. The communication and user interfaces 210 may further comprise logic for presenting one or more user interfaces for communicating information to the user 296 of the prover computing system 205, and information from the verifier 260 to the user 296, as well as between a service/product provider computing system 280-282 and the prover 205.

At the verifier 260, in response to a request for verification from a user 296 via the prover computing system 205, e.g., via a user interface 210 communicating a request to the verifier 260 over the secure channel, the verifier 260 performs operation to project an encoded pattern 290 onto the subject, which in the depicted example is a user 296. The verifier 260 comprises a projection pattern generator 268 which provides the computer logic to generate an encoded pattern based on a current timestamp, and optionally a location stamp of the verifier 260/prover 205. It is presumed that the verifier 260 and prover 205, and thus the user 296 who is using the prover computing system 205, are at substantially the same location since the verifier 260 will be projecting an encoded pattern onto the surface of the subject, e.g., the face of the user 296. Thus, the verifier 260 and prover 205 are within a projection range of the projection equipment 262, where the projection is an image projection based on a visible or invisible light spectrum.

In some illustrative embodiments, the projection pattern generator 268 comprises one or more functions that operate on the current timestamp, and optional location stamp, to generate the encoded pattern, such as a random noise pattern using the timestamp/location stamp as seed values for the random noise pattern function. In some illustrative embodiments, this encoded pattern may be a machine readable pattern that is not able to be read manually by human beings, e.g., a QR code, bar code, or the like. In this way, the encoded pattern, e.g., assumed to be a noise pattern hereafter, generated effectively encrypts or encodes the timestamp/location stamp into the noise pattern, as different seed values will generate different noise patterns. Without access to the noise function and the seed values, an unauthorized individual or system will not be able to recreate the noise pattern or extract the timestamp/location stamp from the noise pattern. As noted above, while in the depicted illustrative embodiment this pattern generation is performed at the verifier 260, in other illustrative embodiments, this pattern generation may be performed at the prover 205 based on an encrypted seed value provided via the secure communication channel and the cryptographic engines 230 and 266.

The encoded pattern 290 generated by the projection pattern generator 268 is projected onto the surface of the subject via the projection equipment 262. For example, in the case of a facial recognition system, the projection equipment 262 projects 292 the encoded pattern 290, e.g., the noise pattern, onto the face of the user 296. This may be done at substantially a same time as the image capture device 220 of the prover computing system 205 operates to capture a digital image 294 of the user 296 with the projected encoded pattern 290, thereby capturing a composite digital image 294 having the encoded pattern embedded into the data of the composite digital image along with the facial features of the user 296.

The cryptographic engine 266 applies cryptographic functions to the timestamp/location stamp to generate an extraction key that can be used by the PEP image authenticator 200 for performing verification operations at the prover 205. The information for performing verification, e.g., the extraction key, timestamp/location stamp, encoded patterns, and the like may be stored in the image verification data storage 269 in association with an identifier of the verification session for purposes of retrieval if necessary to support the various operations described herein. The cryptographic engines 266 and 230 may make use of cryptographic keys corresponding to the verifier 260 and prover 205, e.g., a public-secret key encryption methodology, for encrypting communications and data structures exchanged between the verifier 260 and the prover 205. Moreover, the cryptographic engines 266 and 230 may perform the necessary encryption/decryption operations for generating and encrypting the extraction key, decrypting the extraction key, and the like, so as to support the secure communication of the extraction key from the verifier 260 to the prover 205 such that the PEP image authenticator 200 can authenticate the encoded pattern 290 as captured in the composite digital image by the image capture device 220.

The image veracity verification engine 250 comprises the computer logic that operates to verify the veracity of a captured composite digital image, specifically with regard to the encoded pattern 290, e.g., noise pattern, projected onto the subject 296 and captured by the image capture device 220. The image veracity verification engine 250 identifies the encoded pattern 290 in the captured digital image, which is a composite image having both the subject and the encoded pattern 290 present in the image, by performing a pattern matching based on a pattern generated using the extraction key communicated by the verifier 260 to the prover 205. That is, the verifier 260 transmits the extraction key generated by the cryptographic engine 266 based on the timestamp/location stamp for the projection of the encoded pattern 290 to the prover 205. The received extraction key is encrypted and thus, may be decrypted by the cryptographic engine 230 to extract the timestamp and/or location stamp from the extraction key. This timestamp and/or location stamp may then be input to a similar function, or set of functions, used to generate the encoded pattern 290 to thereby generate a pattern from this timestamp and/or location stamp, which should be the same pattern as the encoded pattern 290 if the encoded pattern 290 captured in composite digital image is legitimate.

Thus, by matching the generated pattern to the encoded pattern 290, the PEP image authenticator 200 may determine whether the captured composite digital image is the recently captured image or not. That is, presented with a composite digital image, the image veracity verification engine 250 may generate the pattern from the timestamp/location stamp and scan the composite digital image to determine if this same pattern is present in the composite digital image. If so, the composite digital image may be determined to be authentic, i.e., the veracity of the composite image is verified. If the generated pattern is not matched with a pattern embedded in the composite digital image, then the veracity of the composite image is not verified. It should be appreciated, as touched upon above, additional checks may be performed with regard to the timestamp and location stamp extracted from the extraction key to determine if they are within a predetermined period of time and/or distance of the current time and location to ensure that even composite images matching the extraction key are not stale.

Thus, based on a matching of the generated pattern to the embedded encoded pattern in the captured composite image, a determination may be made as to whether the composite image is a current composite image of the user 296 or not. That is, if the composite image is not the current composite image, it will not have the correct projected encoded pattern embedded into the composite image. Hence, if there is sufficient matching between the identified embedded encoded pattern in the composite digital image and the generated pattern generated from the timestamp/location stamp extracted from the extraction key, then the image may be verified and an indication of the verification communicated to the verifier 260 and/or providers 280-282. If there is not sufficient matching, then the verification fails and an indication of this failure may be communicated to the verifier 260 and/or providers 280-282.

This verification may involve an evaluation of a plurality of encoded patterns and a sequence of these encoded patterns in some illustrative embodiments. That is, as mentioned above and described further hereafter, the projection of the encoded pattern, or noise pattern, on the subject, e.g., user 296, may be performed in a tiled or partitioned manner, such as in a matrix or grid projection in which sub-patterns correspond to the different partitions, tiles, or the like. As such, each tile or partition will have a sequential value according to row/column of the matrix or grid and the verification may operate to ensure that a sufficient number of these encoded patterns, or sub-patterns for the tiles/partitions are matched and that they are present in the correct sequential order. The sufficient number may be predetermined and set as a configuration parameter based on the desired level of security, e.g., 75% of the tiles/partitions must be matched and be in the correct sequential order. The number may be empirically determined and set so as to allow for some deviation due to inherent inaccuracies in projections and alignment of subjects with the projection of the noise pattern, yet provide sufficient security.

It should be appreciated that this verification performed by the PEP image authenticator 200 is a separate verification from that of the digital identity verification systems 240 and can be performed in parallel with the digital identity verification systems 240. That is, the digital identity verification systems 240 operate on the features of the subject captured in the captured digital image and seek to verify that the subject in the image is an authenticated subject, e.g., that the facial features of the face of the individual presented in the captured digital image match the stored biometric pattern, i.e., stored facial features, in the biometric patterns/template storage 242 for the individual, e.g., so as to perform facial recognition and verification of the user. Thus, the digital identity verification systems 240 operate to verify the subject (e.g., checks (1) and (2) discussed above) whereas the PEP image authenticator 200 operates to verify or authenticate the digital image itself as being a recently captured digital image (e.g., check (3) above).

As shown in FIG. 2, the verifier computing system 260 is operated by an authorized individual who may trigger the generation and projection of an encoded pattern, such as by operating a physical and/or virtual user interface element to initiate the pattern generation by the projection pattern generator 268 and projection of the generated pattern by the projection equipment 262. For example, a user of the verifier computing system 260 may press a button or select a graphical user interface element to trigger the operations of elements 268 and 262. In some cases, the verifier computing system 260 may be automated and may automatically trigger such operations when detecting the presence of the subject, e.g., user 296, within a local vicinity of the verifier computing system 260.

The projection equipment 262 comprises hardware and software used to project a pattern onto a surface, e.g., a visible/non-visible light pattern onto the surface of a subject that is in the physical vicinity of the verifier computing system 260. For example, the verifier computing device 260 may be a smartphone, tablet, kiosk, or the like, and the projection equipment 262 may comprise a light emitter that emits a light pattern onto a subject, e.g., the face of a user 296 of the prover computing system 205. The prover computing system 205 may be a portable computing device, such as a smartphone, table, or the like, and may comprise an image capture device 220, such as a digital camera, that can capture the composite digital image of the user 296 with the projected pattern 290.

The encoded pattern that is projected by the projection equipment 262 may be projected at a granularity that the encrypted pattern is not distinguishable from the resolution of the regular image by the human eye. In some illustrative embodiments, the encoded pattern may be projected at a granularity that is coarser than the resolution of the regular image in order to facilitate a more distortion robust matching. As the pattern is an encoded pattern, or noise pattern, it can be appreciated that the pattern itself is of a non-regular shape. That is, even though the figures generally represent the pattern as a grid of dots for simplicity, the actual pattern may take many different shapes and forms of geometric and non-geometric types. In some cases, the pattern may be similar to a QR code, bar code, or other computer readable code that is not readily readable by human beings.

The projection equipment 262 projects the encoded pattern at substantially a same time as the image capture equipment 220, e.g., camera, captures a digital image of the combination of the subject 296 with the projected encoded pattern 290 appearing on the surface of the subject and the subject's background environment. That is the encoded pattern 290 is projected within a projection field of the projection equipment 262 which substantially corresponds to the image capture field of the image capture equipment

220. The subject is present within the projection and image capture fields along with possibly other elements of the subject's environment. As such, the encoded pattern 290 may be projected onto both the subject and these other elements of the environment. This projection timing may be similar to a flash on a camera where the flash illuminates the image capture field just prior to capturing the image. Similarly, the projection of the encoded pattern 290 may be performed just prior to capturing the digital image.

In some illustrative embodiments, the encoded pattern 290 may be partitioned into a plurality of sub-patterns, also referred to as patches, tiles, or segments, with each sub-pattern having a partition size that may be set based on the size or resolution of the captured digital image. For example, if the captured digital image is 512×512 pixel digital image, the partition-size may be, for example, 32×32 pixels, yielding a 16×16 matrix of encoded patterns or noise patterns (i.e., patches, tiles, or segments) that are projected onto the surface of the subject 296 or within the image capture field of the image capture device 220 (see FIG. 3 hereafter illustrating a projected grid of patches). Thus, in this example, there are patches, tiles, or segments numbered 1 to 256 in sequence, where the sequence may progress across a row and then continue to the next row of the matrix, e.g., the number of the first patch on the second row is 17.

The patches are projected in a corresponding row/column order such that the order of the patches may also be used to verify the patches of the encoded pattern/noise pattern. In some illustrative embodiments, the patches may be projected with a clearly visible reference structure, e.g., frame/grid/fiducials, that is part of the projection and which delineates the various patches, such that distortion and projection scale can be extracted. The color of the frame/grid/fiducials is selected to give a desired contract on a given image/background and is automatically adaptable to the detected pixel values of the given image/background. The projected encoded pattern 290 and the partitioning of the pattern are engineered to the variable resolution and color responses of different cameras such that configuration of the projection equipment 262 may be based on the capabilities of the image capture device 220. In some illustrative embodiments where such a frame/grid/fiducials are not projected, the transition from one patch to another may be smoothed/gradual so as to prevent detection of the boundaries and partial extraction.

At the prover 205, the image veracity verification engine 250 may not only verify the encoded pattern in each patch, but may also verify the proper sequencing of the patch. That is, in some illustrative embodiments, the extraction key may encode not only the timestamp and location stamp of the generated encoded pattern, but may also store information specifying the particular function(s) for generating encoded patterns for each of the tiles, segments, or patches in the grid and their sequences, which may likewise be stored in the image verification data storage 269 of the verifier 260. In such an embodiment, the timestamp and/or location stamp may be input to each of the plurality of functions used to generate encoded patterns. Each of the encoded patterns may be swept across all the patches of the composite digital image to identify matches, if any, and for each match, the corresponding function used to generate the matching pattern can be identified. As a result a sequence of matching patterns (functions) is determined and may be compared to the sequence used to generate the authentic composite image. If a threshold number of patches are properly matched, e.g., 75% of the patches are properly matched in proper sequential order, then the composite digital image may be verified.

For example, in some illustrative embodiments, every patch is swept across the captured digital image and through pattern matching (e.g., auto-correlation) may be identified as present in the captured digital image. If enough of the patches of the encoded pattern or noise pattern are detected, and detected as being present in a correct order, the digital image may be considered "authentic." The timestamp and/or location stamp may also be verified as being within a given period of time of the verification operation and or within a predetermined physical range of the location where the verification is being performed. If these checks all pass, then the image veracity verification engine 250 may determine that the captured digital image is verified and usable for performing digital identity verification by the digital identity verification system 240. In some cases, where digital identity verification is being performed in parallel, this may involve invalidating any digital identity verification being performed if the checks are not all passed as discussed above.

This cryptographic engine 230 may also provide mechanisms for integrity verification by generating a digital signature of the captured digital image. The integrity verification may be performed by the PEP image authenticator 200 and/or digital identity verification systems 240 to ensure integrity of the captured digital image prior to performing other verifications, to thereby ensure that the captured digital image data from the image capture device 220 and stored in the captured image storage 222 for processing has not been tampered with. This is to ensure that the captured digital image is not captured and then modified by a user to try to spoof an authentic embedded encoded pattern within the captured digital image. For example, the integrity mechanisms may involve generating a hash value or other integrity value based on the data of the captured digital image as part of the digital image storage into the captured image storage 222, and requiring that the hash value be matched by a similar hash of a digital image when performing image veracity and digital identity verifications by elements 240 and 250.

To further illustrate an operation of one illustrative embodiment of the present invention, assume that a user 296 of the prover computing device 205 wishes to access services/products of a provider 280 via the one or more data networks 270. The user, via the prover computing device 205, accesses the service/product provider 280, for example, and submits a request which may specify the user identity and optionally a location of the prover computing device 205, which may be automatically determined by location services, global positioning system (GPS), or the like, as is generally known in the art. The provider 280 may then respond with a request that the user 296 of the prover computing device 205 provide biometric verification of the user's identity. Moreover, the provider 280 may request that the verifier 260 provide verification of the user's identity by sending a request to the verifier 260.

In response to the request from the provider system 280, the projection pattern generator 268 of the verifier computing system 260 may generate an encoded pattern based on the current timestamp, and optionally the location stamp, as seed values to one or more encoded pattern generation functions implemented by projection pattern generator 268. The encoded pattern, e.g., noise pattern, is then processed by the cryptographic engine 266 to generate one or more extraction keys and stores this information, e.g., timestamp, location stamp, encoded pattern, extraction keys, etc., in the image verification data storage 269. The encoded pattern is then projected onto the surface of the subject, e.g., the face of the user 296 via the projection equipment 262. At substantially a same time, the verifier 260 transmits the encrypted extraction key(s) to the prover computing system 205.

The image capture equipment 220 of the prover computing system 205 captures a composite digital image of the subject 296 and the projected encoded pattern 290. The cryptographic engine 230 decrypts the encrypted extraction key(s) that were received to obtain the timestamp and/or location stamp and feeds these into the corresponding functions of the image veracity verification engine 250, which employs similar functions as used by the projection pattern generator 268. Moreover, the cryptographic engine 230 may employ integrity information for verifying the integrity of the captured digital image data structure, as discussed previously.

The functions of the image veracity verification engine 250 generate patterns for matching against the embedded encoded patterns of the captured composite image. In performing the matching, the digital image data structure may first be checked by the image veracity verification engine 250 to verify its integrity using the integrity information. This ensures that the digital image data structure was not modified after creation. If the integrity check passes, then further verification is performed; otherwise a response is returned to the verifier computing device 260 and/or provider system 280 indicating that the user's identity could not be verified.

Assuming that the integrity verification passes, the captured composite digital image data structure is then processed in parallel by the PEP image authenticator 200 and the digital identity verification systems 240. The digital identity verification systems 240 operate on the digital image to extract features that can be used to verify the identity of the subject 296, e.g., facial features of a user that are used to verify the image's facial features with stored biometric patterns/templates in the storage 242 for that user, in a manner generally known in the art. The PEP image authenticator 200 operates on the digital image to verify that the digital image is one that was taken recently for this particular identity verification transaction, i.e., that the digital image has a corrected encoded pattern projection that was captured when the digital image was captured and thus, is a recently captured digital image.

The PEP image authenticator 200 identifies the projected encoded pattern from the digital image and processes the identified encoded pattern by matching the pattern(s) generated from the timestamp/location stamp extracted from the extraction key(s) using the functions of the image veracity verification engine 250. If there is a match, then the authenticity of the captured composite digital image is verified indicating that the generated pattern(s) corresponds to the encoded pattern(s) embedded in the composite digital image that was captured. The timestamp and/or location of the client computing device may be compared to a current time and/or current location of the client computing device to further ensure that the captured digital image is a recently captured digital image, i.e., that the timestamp for the encoded pattern is within a given threshold time of the current time and that the current location of the prover computing device 205 is within a given threshold range or distance of the location used to generate the encoded pattern.

Assuming that all checks pass, as determined by the image veracity verification engine 250, the veracity of the captured digital image is verified, e.g., as part of verification operation (3) discussed above. Meanwhile, in the parallel operation, the digital identity verification system 240 performs the other verifications of the subject itself, e.g., verification operations (1) and (2) discussed above. Assuming all three verification operations are passed, the verification of the subject is completed successfully, i.e., the user's face is authenticated as being the face of the authorized user, and the results of the verification may be communicated by the verifier 260 to the provider system 280. The prover computing device 205 may then be used to access the services/products of the provider system 280.

While the above illustrative embodiments are described in the context of a noise pattern being generated based on the timestamp and/or location stamp, as touched upon previously, the invention is not limited to a noise pattern. To the contrary, any computer readable encoded pattern may be used without departing from the spirit and scope of the present invention. For example, in other illustrative embodiments, one or more QR codes, bar codes, or other encoded patterns may be used. Preferably, the encoded patterns are not human readable. However, in some cases the encoded patterns can be human readable, yet not able to be correlated by a human being with a particular cryptographic value or the encoded timestamp/location stamp without the aid of the computer encoding and cryptographic functions of the illustrative embodiments.

With the mechanisms of the illustrative embodiments, an encoded pattern is projected onto the subject at substantially the same time as the digital image is captured. The encoded pattern may encode the timestamp and/or location data for the subject at the time and location of the digital image capture. The encoding may be performed using cryptographic mechanisms and may result in an encoded pattern that is not readable by human beings using the naked eye, but is recognizable by computing tools and computer vision mechanisms, e.g., a Quick Response (QR) encoding, bar code encoding, or any other suitable encoding. The encoding itself may use cryptographic keys and encryption mechanisms to encrypt the data in the pattern such that even if the pattern is perceivable by a party receiving the captured digital image, it cannot readily be decrypted without knowing the appropriate cryptographic keys for proper decryption.

Thus, the illustrative embodiments provide an improved computing tool and an improved computing tool operation/functionality to synchronously verify that the biometric/facial features of a subject match a previously stored and authentic template of an authorized user's biometric/facial features and, at substantially a same time, guarantee that the captured digital image is current. In this way, the mechanisms of the illustrative embodiments can determine that the digital image that is captured is captured from the individual requesting verification and is captured at the time and location alleged by the individual and is not a previously captured digital image or recording of biometric data that has been somehow modified. Thus, the illustrative embodiments enable all three verifications previously described above.

Figure 3:
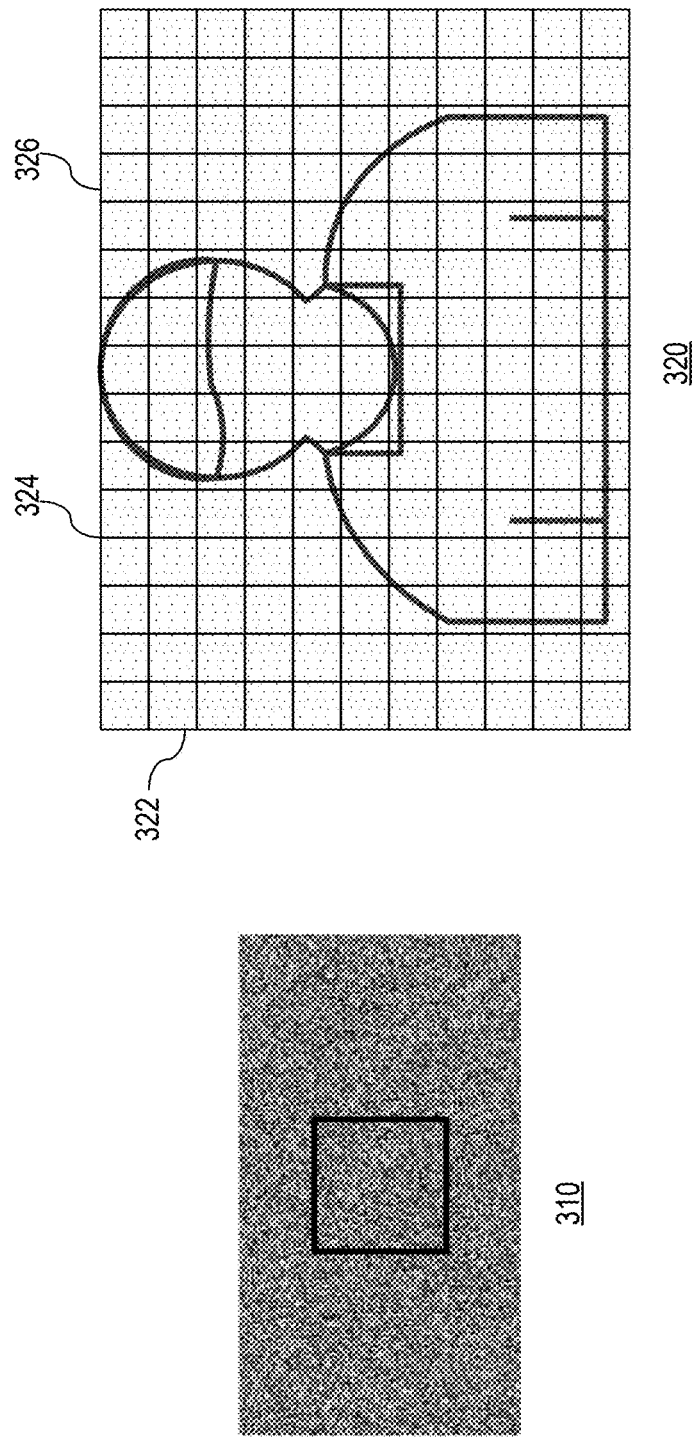
FIG. 3 is an example diagram illustrating a noise pattern and a composite digital image having a subject and noise pattern in accordance with one illustrative embodiment.

FIG. 3 is an example diagram illustrating a noise pattern and a composite digital image having a subject and noise pattern in accordance with one illustrative embodiment. The noise pattern 310 in FIG. 3 may be generated based on a timestamp and/or location stamp of a client computing device at the time when a digital identity verification operation is to be performed using the client computing device. As can be seen from FIG. 3, the noise pattern 310 is a pattern of black/white pixels which is not human readable. This noise pattern 310 may be partitioned into sub-patterns, e.g., 322, 324, 326, etc., as a grid which may be projected onto a subject and the subject's environment when a digital image of the subject is captured. As shown in the composite digital image 320 of FIG. 3, the projection of the noise pattern 310 includes the sub-patterns 322, 324, 326 projected onto the subject and the background. Visible demarcation lines for the matrix of sub-patterns, as well as sub-pattern identifiers, are superimposed on the image with each sub-pattern having an identifier (not shown) in accordance with the sequence of sub-patterns, e.g., 1 to X, where X is the total number of sub-patterns in the grid.

While the composite digital image 320 shown in FIG. 3 shows the noise patterns as a pattern of dots for illustration purposes, it should be appreciated that in some illustrative embodiments, the noise pattern is not readily discernable to the human eye. Moreover, the noise pattern does not obfuscate the subject's features such that digital identity verification can still be performed. However, via computer vision mechanisms of the illustrative embodiments, the noise pattern can be extracted from the composite digital image 320 and each sub-pattern 322-326 verified using the cryptographic engine 230 of the PEP image authenticator 200 and the previously stored cryptographic values in the image verification data storage 222. The image veracity verification engine 250 can then verify that a sufficient number of these sub-patterns 322-326 are not only matching with the stored cryptographic values, but also are presented in the captured digital image in the proper sequence from 1 to X. This ensures that the image is both a recently captured digital image and has not been modified.

Figure 4:
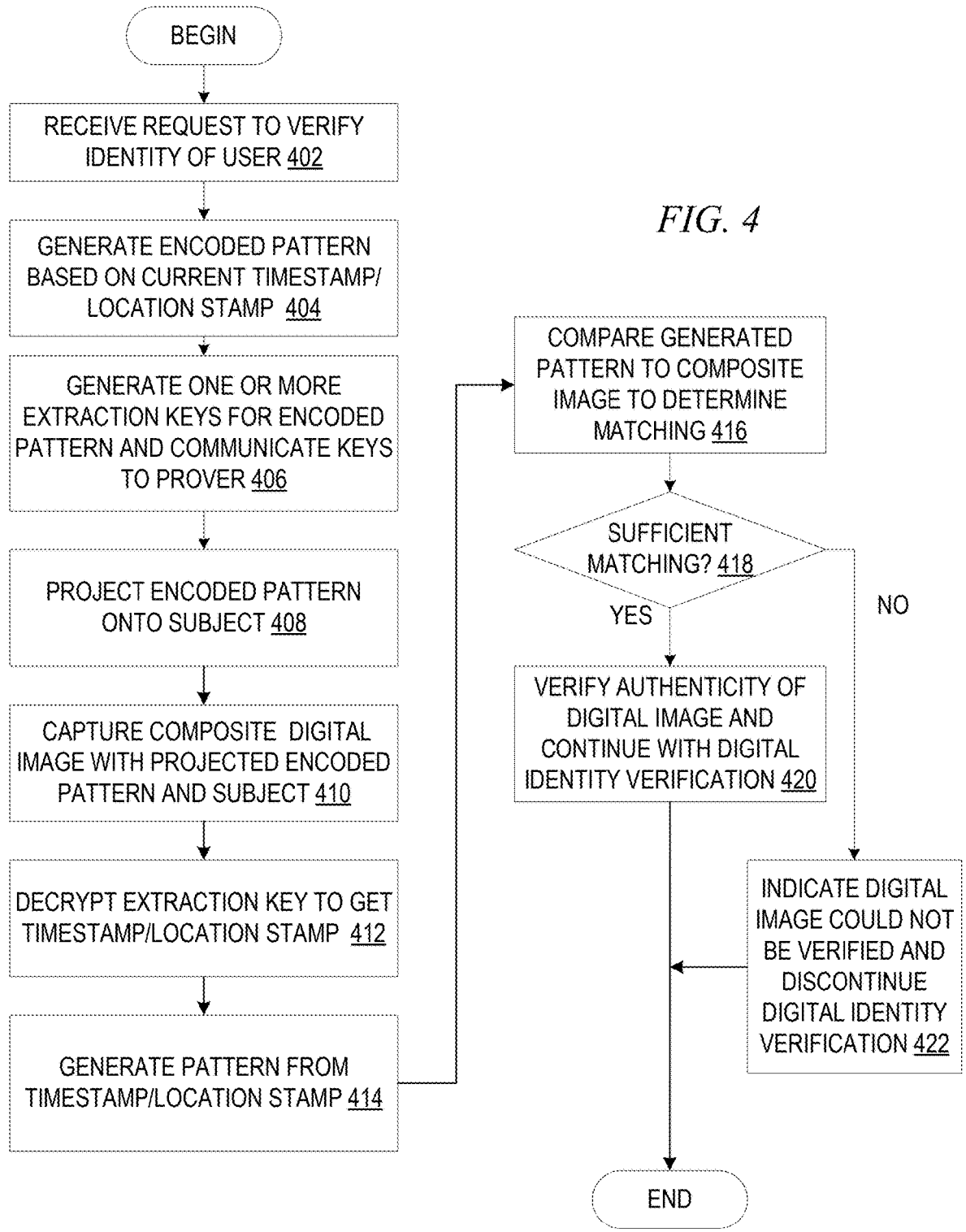
FIG. 4 presents a flowchart outlining example operations of elements of the present invention with regard to one or more illustrative embodiments.

FIG. 4 presents a flowchart outlining example operations of elements of the present invention with regard to one or more illustrative embodiments. It should be appreciated that the operations outlined in FIG. 4 are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIG. 4, and may, in some cases, make use of the results generated as a consequence of the operations set forth in FIG. 4, the operations in FIG. 4 themselves are specifically performed by the improved computing tool in an automated manner.

The operation outlined in FIG. 4 is specific to the captured digital image verification. It should be appreciated that in a parallel operation, the actual features of the subject may be used to perform digital identity verification operations, but are not represented in this flowchart. As shown in FIG. 4, the operation starts by receiving a request to verify the identity of a user (step 402). This request may originate, for example, from a provider computing system of a provider that provides services/products to the user, or a prover computing system used by the user. In response to the request, a verifier computing system generates an encoded pattern based on the current timestamp and optionally a location stamp of the verifier computing system and/or prover computing system (which should be substantially the same) (step 404). One or more cryptographic extraction keys are then generated based on the timestamp and/or location stamp for the encoded pattern and communicated to the prover computing system (step 406). The encoded pattern is then projected onto the surface of the subject (step 408).

A composite digital image is then captured of the subject (step 410). This captured digital image preferably includes the projected encoded pattern and the subject such that the captured digital image is a composite of the encoded pattern and the subject/background captured as being present in the image capture field of the image capturing equipment of the prover computing device. In this way, the projected encoded pattern is embedded into the data of the composite digital image.

The extraction key transmitted from the verifier to the prover is then decrypted at the prover to obtain he timestamp and/or location stamp (step 412) and one or more patterns are generated from the extracted timestamp/location stamp (step 414). The one or more generated patterns are then compared to the embedded encoded pattern(s) in the captured composite digital image (step 416) to determine if there is a sufficient match. If there is a sufficient match (step 418), then the authenticity of the captured composite digital image is verified and the digital identity verification can continue (step 420). If there is not a sufficient match (step 418), then the digital image could not be verified, indicators as to the inability to verify the captured digital image may be returned to the provider system and/or verifier computing system, and the digital identity verification can be discontinued (step 422). The operation then terminates.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for verifying a captured digital image, the method comprising:
generating, by a verifier computing system, in response to a request to perform digital identity verification of a subject, a computer readable first encoded pattern;
projecting, by light projecting equipment of the verifier computing system, the first encoded pattern onto a physical surface associated with the subject;
capturing, by digital image capturing equipment of a prover computing system, a digital image of the subject while the first encoded pattern is projected onto the physical surface such that the captured digital image captures both an image of the subject and the projected first encoded pattern;
generating, by the prover computing system, a second pattern based on an extraction key received from the verifier computing system; and
verifying, by the prover computing system, an authenticity of the captured digital image based on a matching of the second pattern to the first pattern.

2. The method of claim 1, wherein the computer readable encoded pattern is generated based on a function of a timestamp associated with the request.

3. The method of claim 1, wherein the computer readable encoded pattern is a noise pattern, and wherein the noise pattern is present in the captured digital image below a noise level of the captured digital image and is not distinguishable from background noise in the captured digital image.

4. The method of claim 1, wherein the computer readable encoded pattern comprises at least one of a quick response code or a bar code.

5. The method of claim 1, wherein the extraction key is a cryptographic key used to generate the first encoded pattern and is generated based on a function of a timestamp associated with the request, and wherein verifying the authenticity of the captured digital image verifies that the captured digital image is a recently captured digital image within a given time period of the timestamp associated with the request.

6. The method of claim 5, wherein the extraction key is further generated based on a function of a location stamp associated with a physical location of the verifier computing system and wherein the first encoded pattern is further generated based on the location stamp.

7. The method of claim 1, further comprising:
executing a digital identity verification operation on biometric information of the subject in response to results of the verifying operation indicating that the captured digital image is authentic; and
controlling access to resources or performance of a transaction based on the digital identity verification operation.

8. The method of claim 1, wherein the physical surface associated with the subject comprises one of a physical surface of the subject, or a physical surface of a transparent screen provided between the subject and the digital image capturing equipment.

9. The method of claim 1, wherein the first encoded pattern is not perceivable by the naked human eye but is recognizable by computer vision mechanisms, and wherein the first encoded pattern is not decipherable by human beings but is decipherable by computer cryptographic tools.

10. The method of claim 1, wherein the prover computing system is a portable computing device associated with the subject, and wherein the verifier computing system is associated with one of a provider of protected resources, products, locations, or services, or a third party entity that operates to perform verifications on behalf of the provider of protected resources, products, locations, or services.

11. A computer program product comprising a computer readable storage medium having a computer readable program stored therein, wherein the computer readable program, when executed in a data processing system, causes the data processing system to:
generate, by a verifier computing system, in response to a request to perform digital identity verification of a subject, a computer readable first encoded pattern;
project, by light projecting equipment of the verifier computing system, the first encoded pattern onto a physical surface associated with the subject;
capture, by digital image capturing equipment of a prover computing system, a digital image of the subject while the first encoded pattern is projected onto the physical surface such that the captured digital image captures both an image of the subject and the projected first encoded pattern;
generate, by the prover computing system, a second pattern based on an extraction key received from the verifier computing system; and
verify, by the prover computing system, an authenticity of the captured digital image based on a matching of the second pattern to the first pattern.

12. The computer program product of claim 11, wherein the computer readable encoded pattern is generated based on a function of a timestamp associated with the request.

13. The computer program product of claim 11, wherein the computer readable encoded pattern is a noise pattern, and wherein the noise pattern is present in the captured digital image below a noise level of the captured digital image and is not distinguishable from background noise in the captured digital image.

14. The computer program product of claim 11, wherein the computer readable encoded pattern comprises at least one of a quick response code or a bar code.

15. The computer program product of claim 11, wherein the extraction key is a cryptographic key used to generate the first encoded pattern and is generated based on a function of a timestamp associated with the request, and wherein verifying the authenticity of the captured digital image verifies that the captured digital image is a recently captured digital image within a given time period of the timestamp associated with the request.

16. The computer program product of claim 15, wherein the extraction key is further generated based on a function of a location stamp associated with a physical location of the verifier computing system and wherein the first encoded pattern is further generated based on the location stamp.

17. The computer program product of claim 11, wherein the computer readable program further causes the data processing system to:
execute a digital identity verification operation on biometric information of the subject in response to results of the verifying operation indicating that the captured digital image is authentic; and
control access to resources or performance of a transaction based on the digital identity verification operation.

18. The computer program product of claim 11, wherein the physical surface associated with the subject comprises one of a physical surface of the subject, or a physical surface of a transparent screen provided between the subject and the digital image capturing equipment.

19. The computer program product of claim 11, wherein the first encoded pattern is not perceivable by the naked human eye but is recognizable by computer vision mechanisms, and wherein the first encoded pattern is not decipherable by human beings but is decipherable by computer cryptographic tools.

20. A data processing system, comprising:
a verifier computing system comprising light projecting equipment; and
a prover computing system comprising digital image capturing equipment, wherein the verifier computing system and prover computing system are configured to perform the operations of:
generating, by the verifier computing system, in response to a request to perform digital identity verification of a subject, a computer readable first encoded pattern;
projecting, by the light projecting equipment of the verifier computing system, the first encoded pattern onto a physical surface associated with the subject;
capturing, by the digital image capturing equipment of the prover computing system, a digital image of the subject while the first encoded pattern is projected onto the physical surface such that the captured digital image captures both an image of the subject and the projected first encoded pattern;
generating, by the prover computing system, a second pattern based on an extraction key received from the verifier computing system; and verifying, by the prover computing system, an authenticity of the captured digital image based on a matching of the second pattern to the first pattern.

\* \* \* \* \*